United States Patent
Cotton et al.

(10) Patent No.: US 10,124,483 B1
(45) Date of Patent: Nov. 13, 2018

(54) ALL TERRAIN GROUND ROBOT WITH COMPLIANT LEG SYSTEM, ENERGY RECYCLING FEATURES AND ZERO TURN CAPABILITIES

(71) Applicants: Sebastien Cotton, Pensacola, FL (US); Colton Black, Cantonment, FL (US)

(72) Inventors: Sebastien Cotton, Pensacola, FL (US); Colton Black, Cantonment, FL (US)

( * ) Notice: Subject to any disclaimer, the term of this patent is extended or adjusted under 35 U.S.C. 154(b) by 0 days.

(21) Appl. No.: 15/139,321

(22) Filed: Apr. 26, 2016

(51) Int. Cl.
*B62D 57/02* (2006.01)
*B25J 5/00* (2006.01)
*B62D 61/00* (2006.01)
*H02K 7/18* (2006.01)
*H02K 7/00* (2006.01)
*H02N 2/18* (2006.01)

(52) U.S. Cl.
CPC ............ *B25J 5/007* (2013.01); *B62D 61/00* (2013.01); *H02K 7/006* (2013.01); *H02K 7/1876* (2013.01); *H02N 2/18* (2013.01)

(58) Field of Classification Search
CPC .......... B25J 5/007; B62D 61/00; B62D 51/06; B62D 57/02; A63H 17/00
See application file for complete search history.

(56) References Cited

U.S. PATENT DOCUMENTS

| | | | | |
|---|---|---|---|---|
| 1,987,314 A * | 1/1935 | Turner | ............... | B60B 15/18 305/5 |
| 2,664,962 A * | 1/1954 | Faszczuk | ............... | B62M 27/02 180/195 |
| 3,529,479 A * | 9/1970 | Ryan | ............... | A63H 17/12 180/8.2 |
| 4,200,161 A * | 4/1980 | Penington, Jr. | ........ | A61G 5/061 180/8.2 |
| 4,387,891 A * | 6/1983 | Knochel | ............... | A61H 3/00 135/67 |
| 6,402,161 B1 * | 6/2002 | Baghdadi | ............... | B62B 5/026 180/8.2 |
| 6,964,309 B2 * | 11/2005 | Quinn | ............... | B62D 57/022 180/8.1 |
| 7,165,637 B2 * | 1/2007 | Tanielian | ............... | B62D 57/00 180/7.1 |
| 7,380,618 B2 * | 6/2008 | Gunderson | ........ | B62D 49/0635 180/7.1 |
| 7,503,567 B2 * | 3/2009 | Frankie | ............... | A61G 5/04 180/8.2 |
| 7,794,300 B2 * | 9/2010 | Moll | ............... | A63H 33/003 446/164 |
| 7,806,208 B2 * | 10/2010 | Gunderson | ........ | B62D 49/0635 180/7.1 |
| 8,197,298 B2 * | 6/2012 | Willett | ............... | A63H 17/02 446/164 |
| 9,308,968 B2 * | 4/2016 | Kwon | ............... | B62M 29/02 |
| 2012/0059520 A1 * | 3/2012 | Kossett | ............... | B60B 1/042 700/264 |

\* cited by examiner

*Primary Examiner* — Anne Marie M Boehler
*Assistant Examiner* — Michael R Stabley
(74) *Attorney, Agent, or Firm* — Woodruff & Blade, LLC; Paden E. Woodruff, IV

(57) ABSTRACT

A ground robot, comprising of a body including a drivetrain and a tail, and a plurality of hub and compliant leg assembly, capable of traveling at high speed over different terrain, with several apparatus and means to mechanically or to electrically recycle energy, and zero turn capabilities for agile maneuvers.

6 Claims, 23 Drawing Sheets

ALL TERRAIN GROUND ROBOT WITH COMPLIANT LEG SYSTEM, ENERGY RECYCLING FEATURES AND ZERO TURN CAPABILITIES

RELATED APPLICATIONS

This application claims the benefit of provisional application No. 62/153,354.

FIELD OF INVENTION

This invention relates generally to the field of all-terrain vehicles and more specifically to all-terrain robots for traversing any type of surface and to robots with both mechanical and electrical energy recycling and generation features.

DESCRIPTION OF THE RELATED ART

Robotics technologies are becoming more and more popular in many applications and different environments such as on the ground, in the air, under or over water and in space. As of today, robots are mostly used in ground applications. To date, robots and ground vehicles have been relying mostly on two technologies to travel: wheels and tracks. Wheeled robots are able to reach high speed but perform poorly in rough terrains. Tracked robots perform well in rough terrains but are rather slow. Due to their geometry and the way they work, wheels and tracks have permanent contact with the ground, resulting in large energy losses due to friction. Wheels and tracks are also not capable of recycling energy unless used in combination with an energy transformation system and during specific phases such as regenerative braking (U.S. Pat. No. 5,291,960). Also because of their non-holonomic geometry, most ground vehicles equipped with wheels cannot rotate in place along the vertical axis (this motion is referred to as zero turn radius motion). Tracked vehicles are usually capable of a zero turn radius. Legged robots are actively being researched and developed. In the future they will be able to perform many tasks in many environments, but current technology and control systems required to operate this category of robot are not mature yet, resulting in poor overall performances and capabilities.

Many applications require vehicles and more specifically robots to travel over several types of terrains at high speed over long distances while remaining energy efficient. Several systems described below have been invented to answer part of those needs, but none solve them all at once.

U.S. Pat. No. 7,165,637 describes a vehicle made of a body with three actuated legs used for propulsion. U.S. Pat. No. 7,249,640 and U.S. Pat. No. 6,964,309 describe robots made of four or six sets of WHEGS™ (combination of wheels and rigid legs). U.S. Pat. No. 7,588,105 describes a reciprocating leg pair providing a virtual wheel as conveyance mechanism. U.S. Pat. No. 8,789,630 describes an apparatus for varying the stiffness of a leg of a robotic system. U.S. Pat. No. 3,529,479 describes a toy with a specific gear train and clutch arrangement and spider-type wheels to create erratic movement. U.S. Pat. No. 6,481,513 describes a robot comprising a body and at least 6 compliant C shaped legs each having only one actuator.

The present invention, unlike any of the prior art, is capable of traveling at high speed over different terrains (including rough terrain) while recycling energy and providing agile maneuvering with zero turn radius capabilities.

SUMMARY OF THE INVENTION

The present invention is an all-terrain ground robot comprising a body, a tail rigidly connected to the body, and two rotating hubs with compliant legs. Each hub is driven by a motor that can rotate in either clockwise or counterclockwise. Motors and transmission systems between each motor and hub are enclosed in the robot's body. A tail is rigidly attached to the body and allows for transmitting torque between the motors and the ground when motors are rotating. At its end, in contact with the ground, the tail is equipped with a wheel that can be spring loaded to better absorb ground irregularities.

Compliant legs enable energy recycling capabilities and give the present invention the ability to travel at high speeds over different sorts of terrain including but not limited to asphalt, rocks, grass, dirt, sand, mud. When in operation, due to intermittent contact with the ground, the rotating hubs with compliant legs have less friction than a wheel, which results in less energy loss. In one embodiment, legs can be fitted with a magnet, and hubs with a coiled conductive cable, to generate energy at each step with the magnet going back and forth through the coil. Using only two rotating hubs, one on each side of the body, allows the robot to turn in place.

The preferred embodiment of the present invention can be controlled with a remote or operated autonomously with appropriate sensors. In a preferred embodiment, the robot is passively stable and does not need specific sensors or energy from a battery source to maintain its balance. In alternative embodiments, sensors can be added to improve the robot's performances and enable new capabilities. Because the robot is passively stable, it can start and come to a stop without additional help or mechanisms.

BRIEF DESCRIPTION OF THE SEVERAL VIEWS OF THE DRAWINGS

The accompanying drawings, which are incorporated in and form a part of the specification, illustrate the embodiments of the present invention and together with the description, serve to explain the principles of the invention.

REFERENCE NUMERALS

- 001 Robotic System
- 002 Ground
- 003 Obstacle
- 100 Body Assembly
- 101 Body
- 200 Hub and Legs Assembly
- 201 Hub
- 202 Hub Cap
- 203 Hub Sliding Guide
- 204 Hub Outer Mechanical Stop
- 205 Hub Inner Mechanical Stop
- 206 Hub Cap Screw
- 207 Hub Elastic Holder
- 211 Leg
- 212 Foot
- 213 Leg Elastic Holder
- 214 Leg Outer Mechanical Stop
- 215 Leg Inner Mechanical Stop
- 216 Leg Elastic
- 217 Leg Coil Spring
- 218 Leg Bushing
- 300 Tail Assembly
- 301 Tail
- 302 Tail Wheel
- 303 Tail Wheel Shaft
- 304 Tail Spring Guide
- 305 Tail Shaft Housing
- 306 Tail Spring
- 500 Drivetrain Assembly
- 501 Motor
- 502 Motor Gear Box
- 503 Motor Shaft
- 504 Ball Bearings
- 505 Shaft Clamp
- 506 Shaft Coupler
- 507 Shaft
- 508 Shaft with Tapped End
- 509 Screw
- 510 Thrust Bearing
- 511 Bevel Gear
- 512 Clamp Hub
- 600 Electronics Modules Assembly
- 601 Sensory Unit
- 602 Battery Unit
- 603 Control Unit
- 604 Communication Unit
- 700 Energy Generation Assembly
- 701 Leg with integrated magnet
- 702 Hub with integrated coil
- 703 Circuitry
- 704 Piezo stack actuator

DETAILED DESCRIPTION OF THE INVENTION

Referring to the accompanying drawings in which like reference numbers indicate like elements, FIGS. 1A to 6B show several embodiments of the present invention. While the embodiments presented and described here are preferred embodiments, other embodiments are able to produce similar results and as such the present invention should not be limited to presented embodiments.

The present invention provides a robotic system 001 capable of traveling at various speeds over different sorts of terrain including but not limited to asphalt, rocks, grass, dirt, sand, and mud. The robotic system 001 is capable of turning in place along its vertical axis making it perfectly suited for agile maneuvers. The robotic system 001 is also highly energy efficient by recycling energy through mechanical and electrical means. The robotic system 001 comprises a body, a tail rigidly connected to the body, and two rotating hubs with compliant legs as shown in FIG. 1A.

Figure 1A:
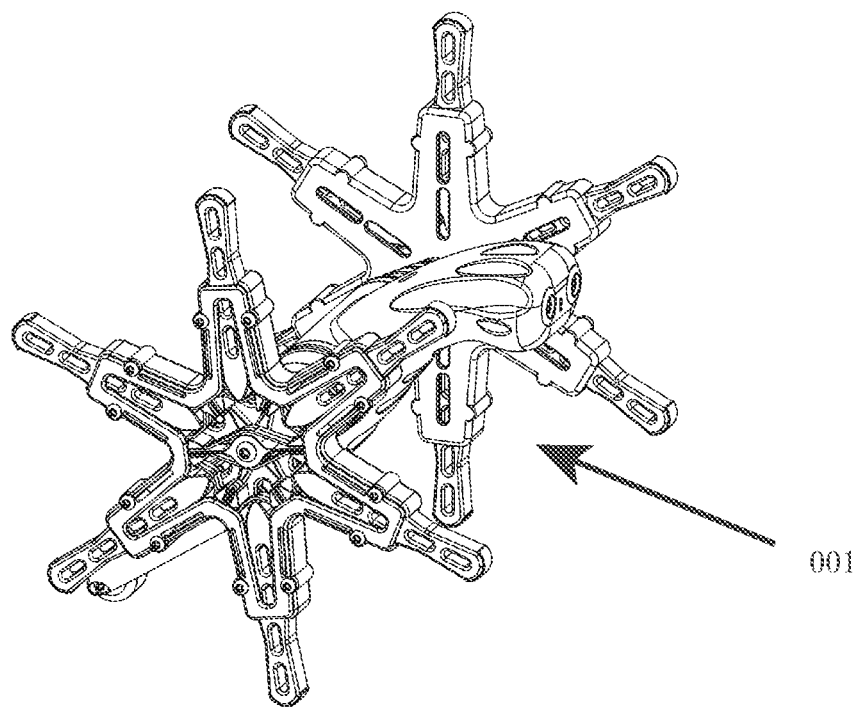
FIG. 1A shows a perspective view of the robot.
Figure 1B:
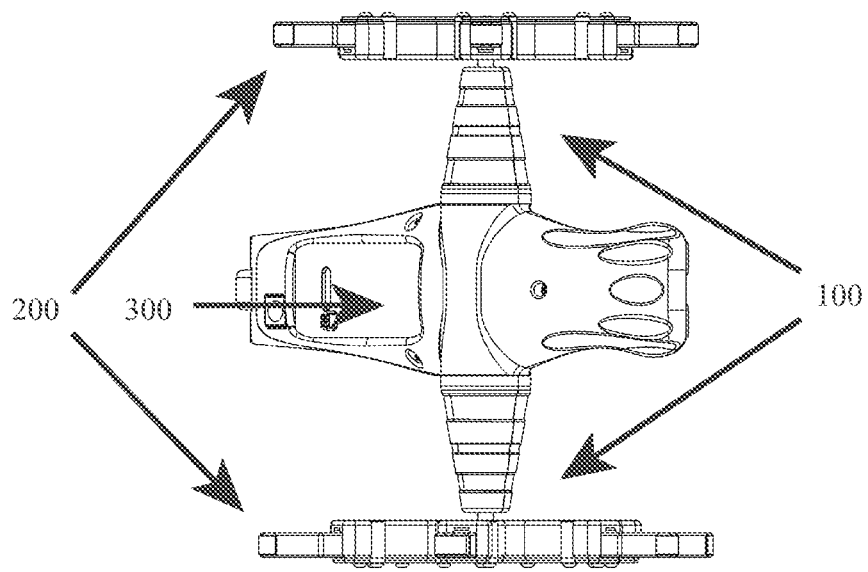
FIG. 1B shows a top view of the robot
Figure 1C:
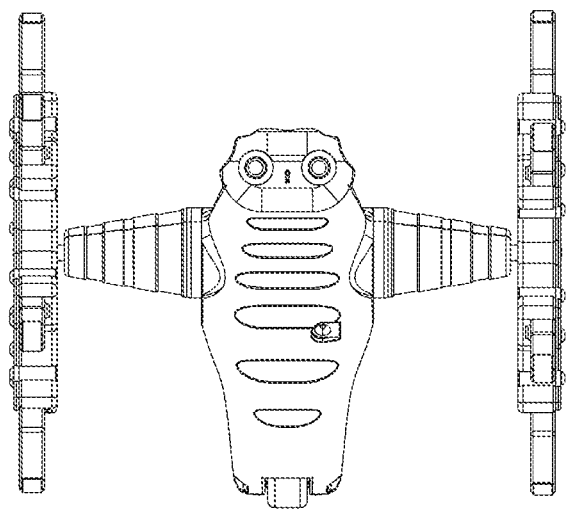
FIG. 1C shows a front view of the robot
Figure 1D:
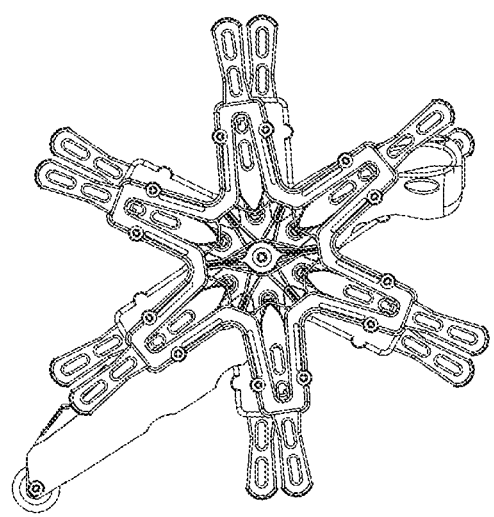
FIG. 1D shows a side view of the robot

FIG. 1A shows a perspective view of robotic system 001. FIG. 1B shows a top view of robotic system 001. FIG. 1C shows a front view of robotic system 001. FIG. 1D shows a side view of robotic system 001. In a preferred embodiment, two hub and leg assemblies 200 are attached to the left and right side of the body assembly 100. The tail assembly 300 is rigidly connected to the body assembly 100.

Figure 5A:
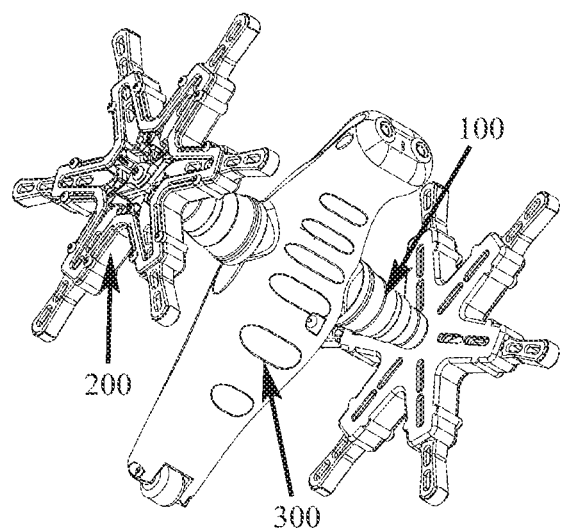
FIG. 5A shows a perspective view of the tail attached to the body.
Figure 5B:
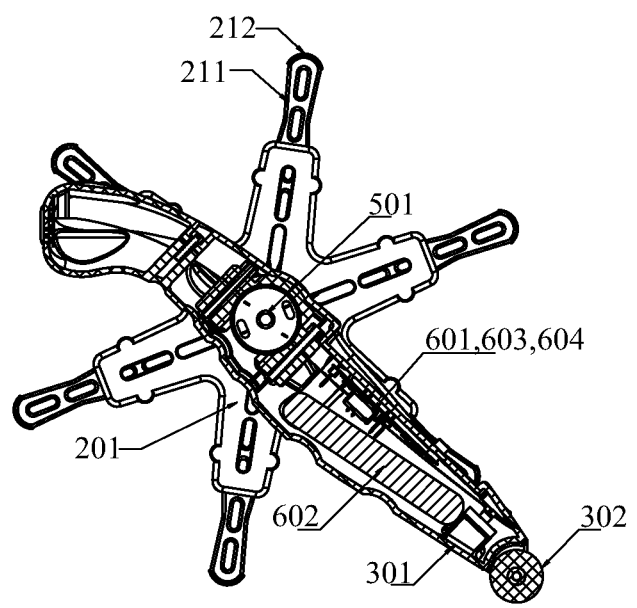
FIG. 5B shows a cross section of the inside of the tail.

When robotic system 001 is resting on the ground, robotic system 001 is in contact with the ground through at least one foot 212 per hub and leg assembly 200 as shown in FIG. 5B (meaning at least one foot 212 per side), and, occasionally through the tail wheel 302.

Figure 2A:
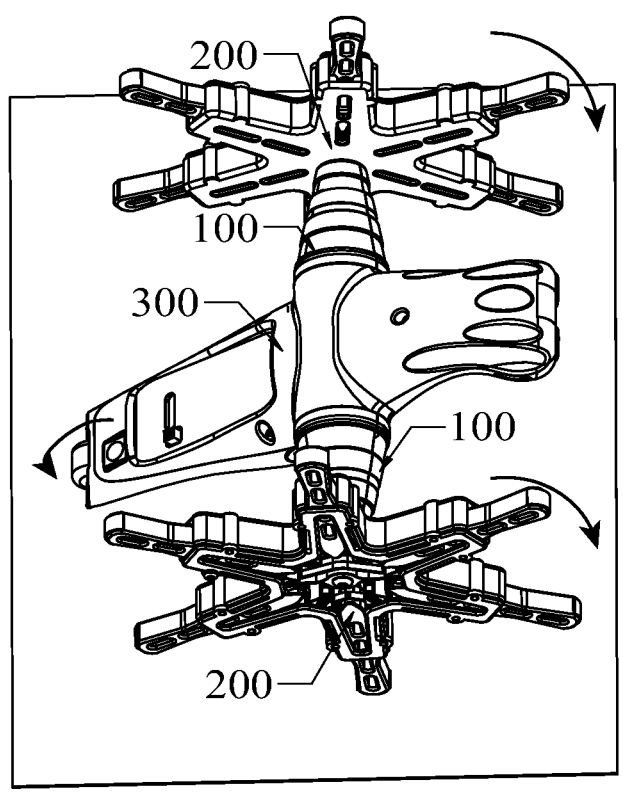
FIG. 2A shows the robot action of the motors on the hubs and tails

FIG. 2A shows robotic system's 001 normal mode of operation. When required, a torque can be provided to rotate both hub and leg assemblies 200 in the same direction (left and right motors are rotating in opposite directions due to their mechanical arrangement in body assembly 100). Since motors 501 are rigidly connected to body assembly 100 and that body assembly 100 is rigidly connected to tail assembly 300, the tail assembly 300 will tend to rotate in the opposite direction of the hub and leg assembly 200. If not already in contact with the ground through tail wheel 302, the tail assembly 300 will quickly rotate under the effect of the torque provided by the motors 501 and the tail wheel 302 will return to the ground. This connection with the ground will force both hubs and leg assembly 200 to rotate, which results in propelling the robotic system 001 forward. Robotic system 001 is also capable of driving backwards.

Figure 2B:
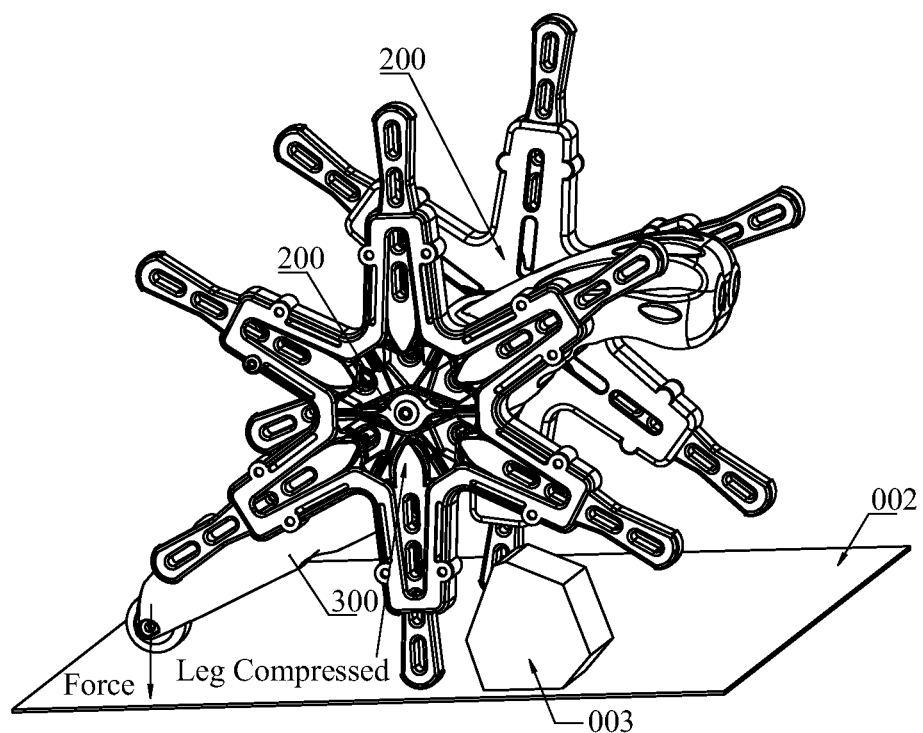
FIG. 2B shows the interaction between the robot leg and the ground

FIG. 2B shows the interaction between the robotic system 001 and the ground 002. When moving forward or backward, both hub and leg assemblies 200 are rotating. Because of this rotational motion, each leg of both hubs 201 will be hitting the ground successively and repeatedly. When a leg hits the ground through its foot, a ground reaction force is transmitted through the leg causing it to translate through hub's sliding guide 203. This causes the leg's inner mechanical stop 215 to contact and transmit force to leg elastic 216. In alternative embodiments other spring devices can be used, such as a coil spring, leaf spring, gas or hydraulic spring, among others. Under the action of the force, leg elastic 216 will deform. By deforming leg elastic 216, some of the robotic system's 001 potential energy is effectively stored in the elastic 216 during the first part of the stance and then released as kinetic energy, propelling the robotic system 001. This phenomenon results in substantial energy recycling which, combined with intermittent contact with ground 002, makes robotic system 001 highly energy efficient.

Figure 2C:
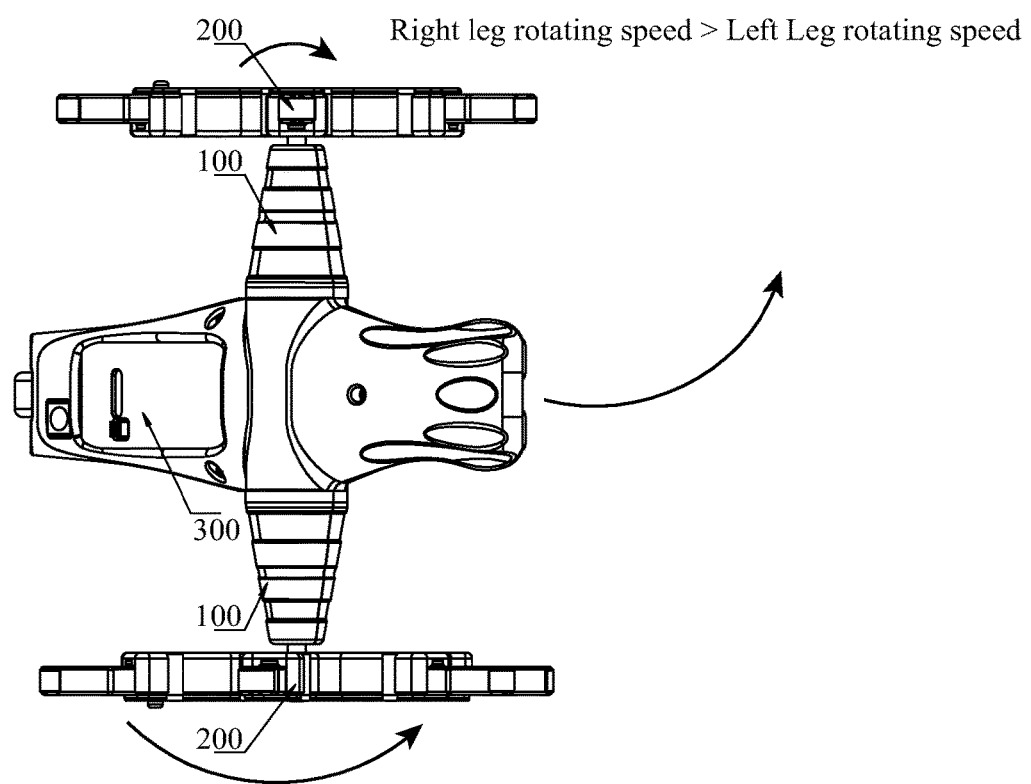
FIG. 2C shows the robot turning while moving forward

FIG. 2C shows robotic system 001 turning while moving forward. While moving forward, robotic system 001 is able to turn if each hub and leg assembly 200 is rotating in the same direction at different speeds. Robotic system 001 will rotate toward the hub and leg assembly with the slower rotational speed.

Figure 2D:
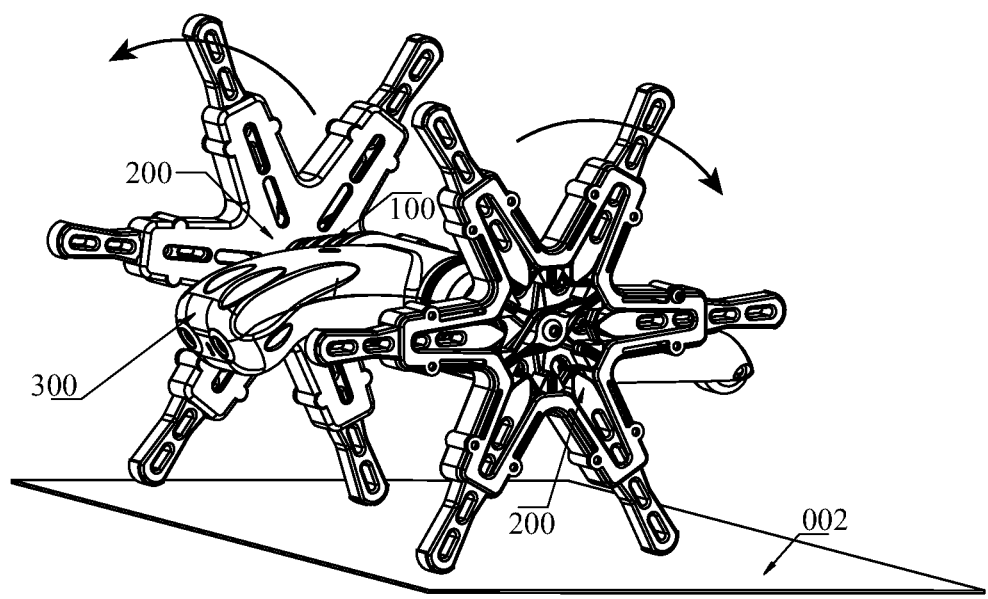
FIG. 2D shows the robot turning in place

FIG. 2D shows robotic system 001 turning in place. Because of its architecture, robotic system 001 is able to turn in place around its vertical axis (axis perpendicular to the body axis going through center of both hub and leg assemblies 200). To perform this action, both motors 501 rotate in the same direction. The torque of each motor 501 will be transmitted to connected hub and leg assemblies 200. Under the effect of these torques, the left and right leg assemblies will rotate in opposite directions. Because the left and right hub and leg assemblies 200 rotate in opposite directions, the net torque transmitted to the tail assembly 300 is zero or close to zero, meaning that the tail assembly 300 is not exercising any force on the ground 002. With left and right hub and leg assemblies 200 rotating in opposite directions without the tail assembly 300 exercising a force on the ground, robotic system 001 will start turning around its vertical axis. Under the effect of the centrifugal force from the rotation of robotic system 001, tail assembly 300 may lift from the ground. This turning in place feature, often referred to as zero turn radius motion, reinforces robotic system's 001 ability to traverse different kinds of terrain and improves its maneuverability.

Figure 2E:
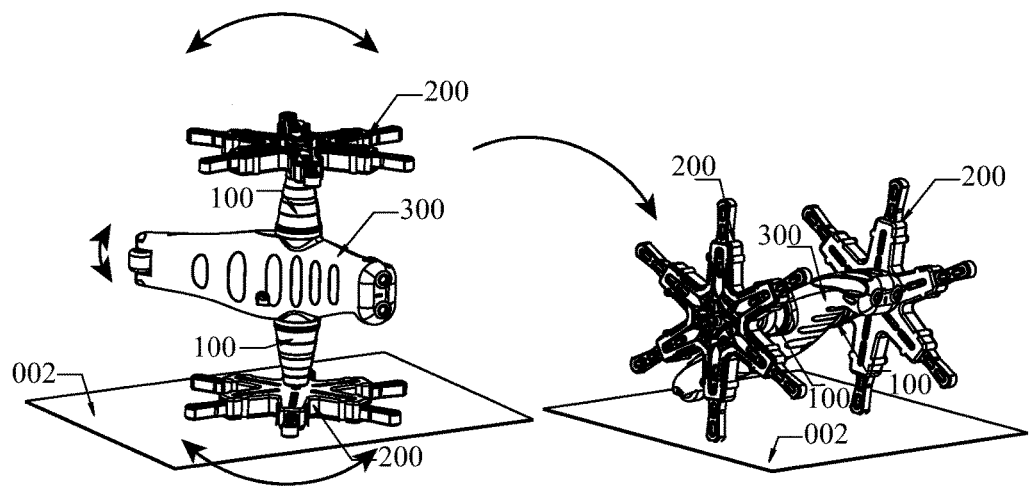
FIG. 2E shows the robot recovering from a side position

FIG. 2E shows robotic system 001 recovering from a side position. During operation, robotic system 001 may end up laying on its side with one of the hub and leg assemblies laying against the ground as depicted. Robotic system 001 is able to detect that it is stuck in this configuration because sensory unit 601 measures the robotic system's 001 relative angle with the ground. In a preferred embodiment, when robotic system 001 detects this configuration, it will automatically start rotating both hub and leg assemblies 200. Because the hub and leg assembly 200 laying against the ground 002 is encountering more friction than the other hub and leg assembly 200, the net torque applied on the tail assembly 300 will be different from zero, resulting in a rotating motion of the tail assembly 300 around the axis passing through the center of both hub and leg assemblies 200. This rotating motion is creating a moment around the axis that will eventually become large enough to tip over robotic system 001 and bring it back to a normal operating mode.

FIGS. 3A through 3D show in detail the drivetrain assembly 500 inside the body 100 of robotic system 001.

Figure 3A:
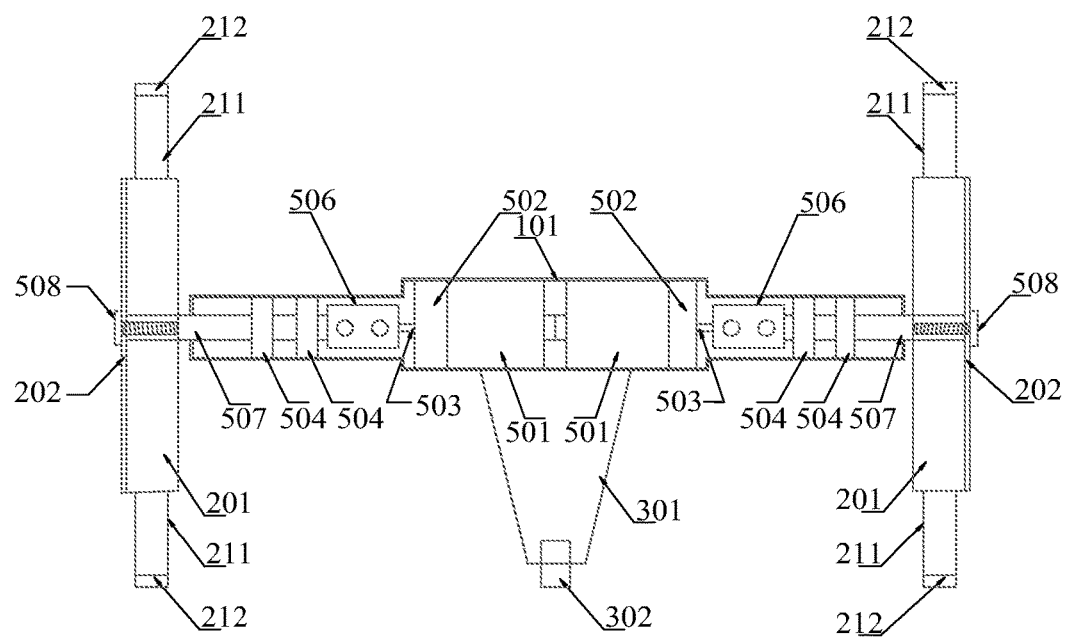
FIG. 3A shows a cross section view of the drivetrain using a tapped shaft

FIG. 3A shows a cross section view of the drivetrain assembly 500 using a shaft with one tapped end 508. The drivetrain assembly 500 is made of two identical subassemblies, one for driving each of the two hub and leg assemblies 300. Each sub assembly is comprised of: a motor 501, motor gear box 502, motor shaft 503, shaft coupler 506, shaft with tapped end 508; and at least two ball bearings 504. The motor 501 and the ball bearings 504 are mechanically fixed to the body 101. Ball bearings 504 are attached to the shaft with tapped end 508. The ball bearings 504 transmit torque and forces from the hub 201 to the body 101 away from the motor shaft 503. The shaft coupler 506 transmits the torque from the motor 501 to the hub 201. The shaft with tapped end 508 is fixed to the hub 201 with a screw 509 going through the hub 201 and hub cap 202.

Figure 3B:
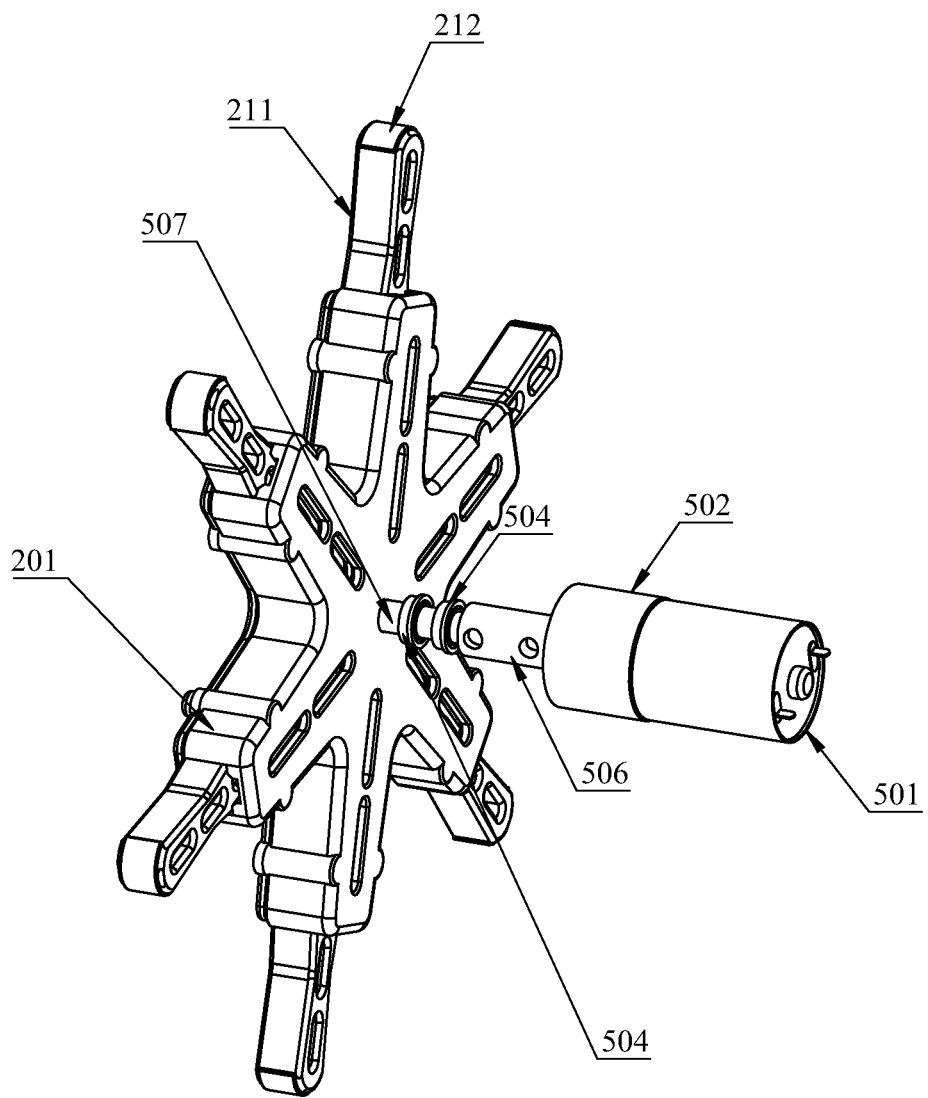
FIG. 3B shows a perspective view of one side of the drivetrain using a tapped shaft.

FIG. 3B shows a perspective section view of one side of the drivetrain 500 using a shaft with one tapped end 508.

Figure 3C:
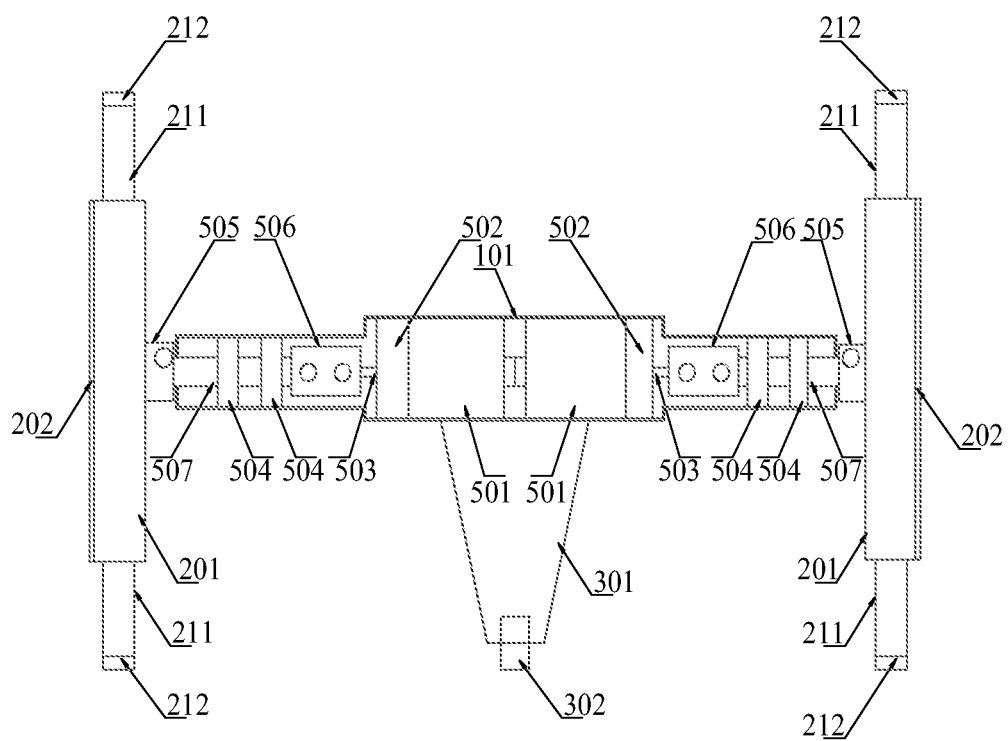
FIG. 3C shows a cross section view of the drivetrain using a shaft clamp.

FIG. 3C shows a cross section view of a preferred embodiment of the drivetrain 500 using a shaft clamp 505. The drivetrain assembly 500 comprises two identical subassemblies, one for driving each of the two hub and leg assemblies 300. Each sub assembly is comprised of: a motor 501, motor gear box 502, motor shaft 503, shaft coupler 506, shaft 507, shaft clamp 505 and at least two ball bearings 504. The motor 501 and the ball bearings 504 are mechanically fixed to the body 101. Ball bearings 504 are attached to the shaft 507. The bearings 504 transmit torque and forces from the hub 201 to the body 101 away from the motor shaft 503. The shaft coupler 506 transmit the torque from the motor 501 to the hub 201. The shaft clamp 505 is screwed to the hub 201, and clamped to the shaft 507. The shaft 507 goes through the hub 201 and hub cap 202.

Figure 3D:
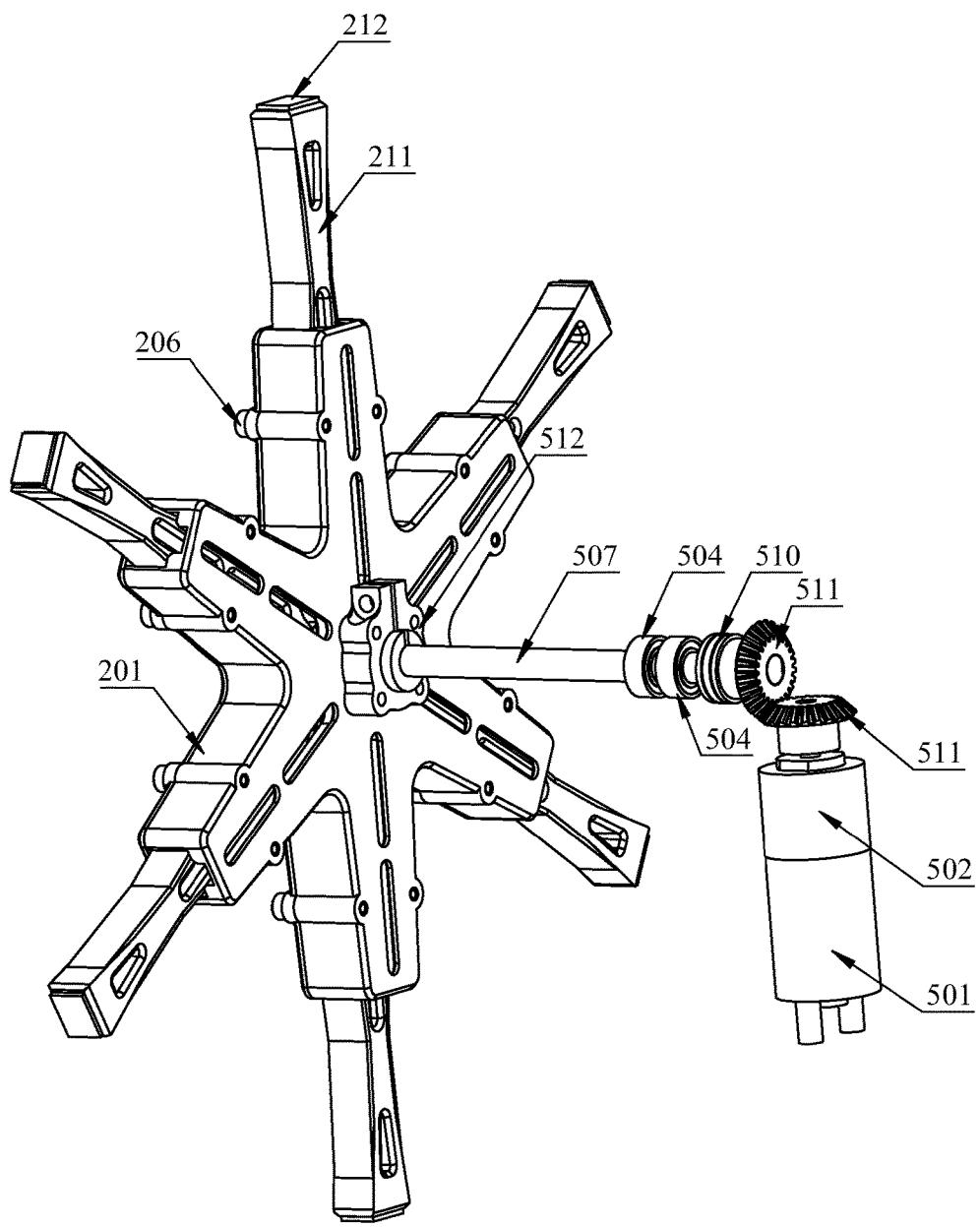
FIG. 3D shows a perspective view of one side of the drivetrain using a shaft clamp.

FIG. 3D shows a perspective section view of one side the drivetrain 500 using a shaft clamp 505.

FIGS. 4A through 4D show in detail the hubs 201 and compliant legs of robot 001.

Figure 4A:
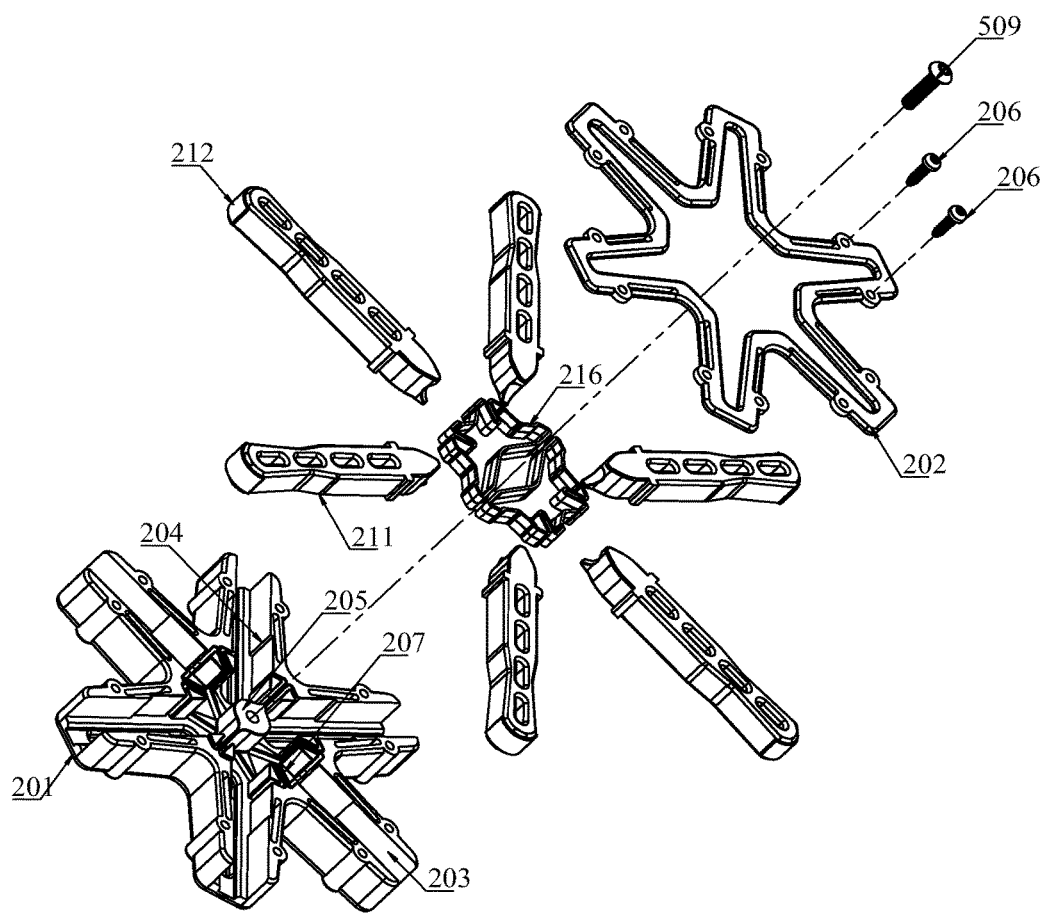
FIG. 4A shows a perspective view of the assembly of the hub and legs.

FIG. 4A shows a perspective view of the assembly of the hub 201 and legs 211. The hub cap 202 is attached to the hub 201 with one or more hub cap screw 206 inserted at each side of the leg 211. The hub 201 can contain one or more legs 211, and one or more hub sliding guides 203. In a preferred embodiment, each hub 201 has six legs 211 and six hub sliding guides 203. In a preferred embodiment, the degree of separation between each leg is proportional to the number of legs, in a preferred embodiment 60 degrees separate each leg. The mechanical architecture of hub 201 provides an enclosure for each leg 211 and prevents them from exiting the hub 201. The hub sliding guide 203 acts as a linear bearing to guide each leg's 211 motion. The leg inner mechanical stop 215 acts as a mechanical stop for leg 211 when leg 211 is moving toward the center of hub 201 and contacts the hub inner mechanical stop 205. Leg outer mechanical stop 214 prevents leg 211 from exiting the hub 201 when entering in contact with hub outer mechanical stop 204. The hub cap 202 has three functions: maintain the legs 211 position in the hub sliding guide 203, close the hub sliding guide 203, keep the leg elastic 216 in place. Leg elastic 216 is inserted into the hub 201 and held in place by the hub elastic holders 207.

Figure 4B:
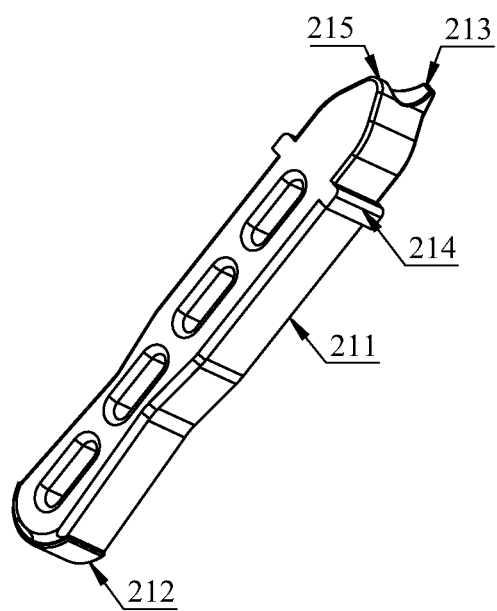
FIG. 4B shows a perspective view of one leg.

FIG. 4B shows a perspective view of one leg 211. The foot 212 is made of high friction material such as but not limited to rubber, and connected to one end of leg 211 to provide better grip with the ground. Foot 212 has a semi-circular shape but could have a different shape to improve performance on specific terrains such as but not limited to snow or water. The leg elastic holder 213 holds the leg elastic 216 in place.

Figure 4C:
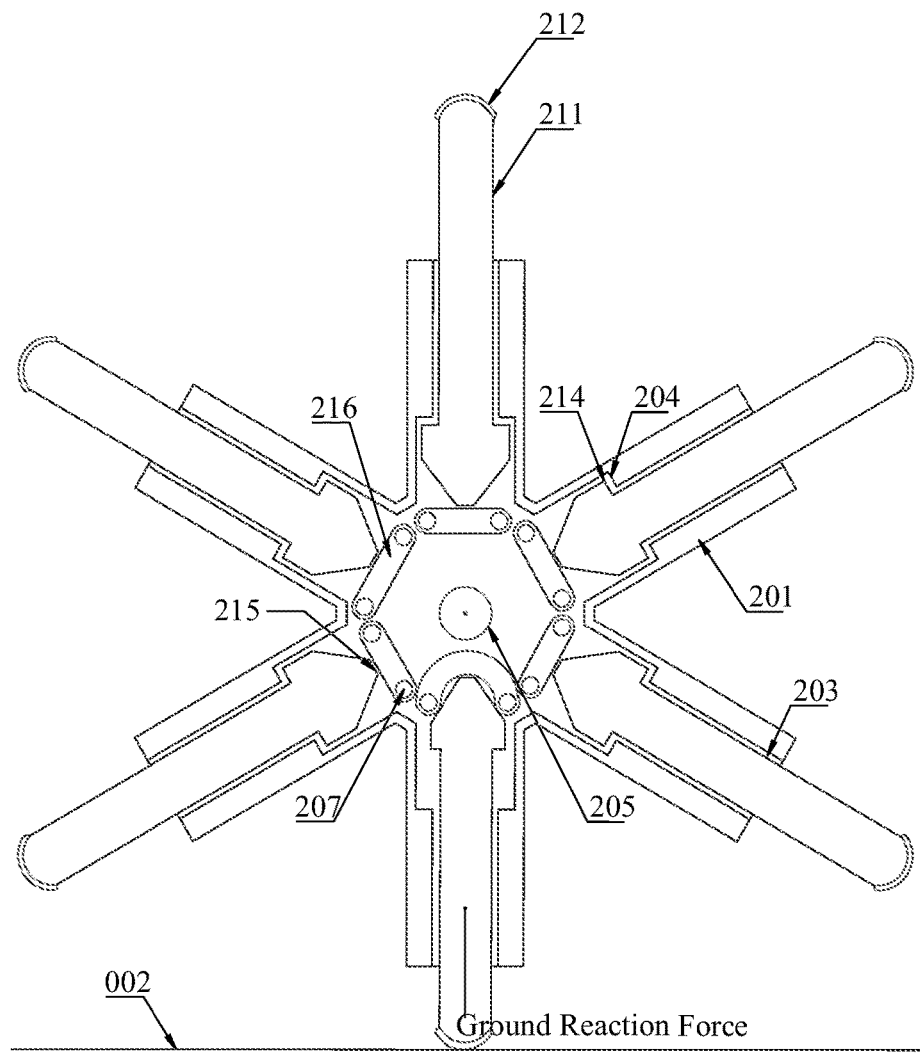
FIG. 4C shows a cross section view of the hub and legs with elastics.
Figure 4D:
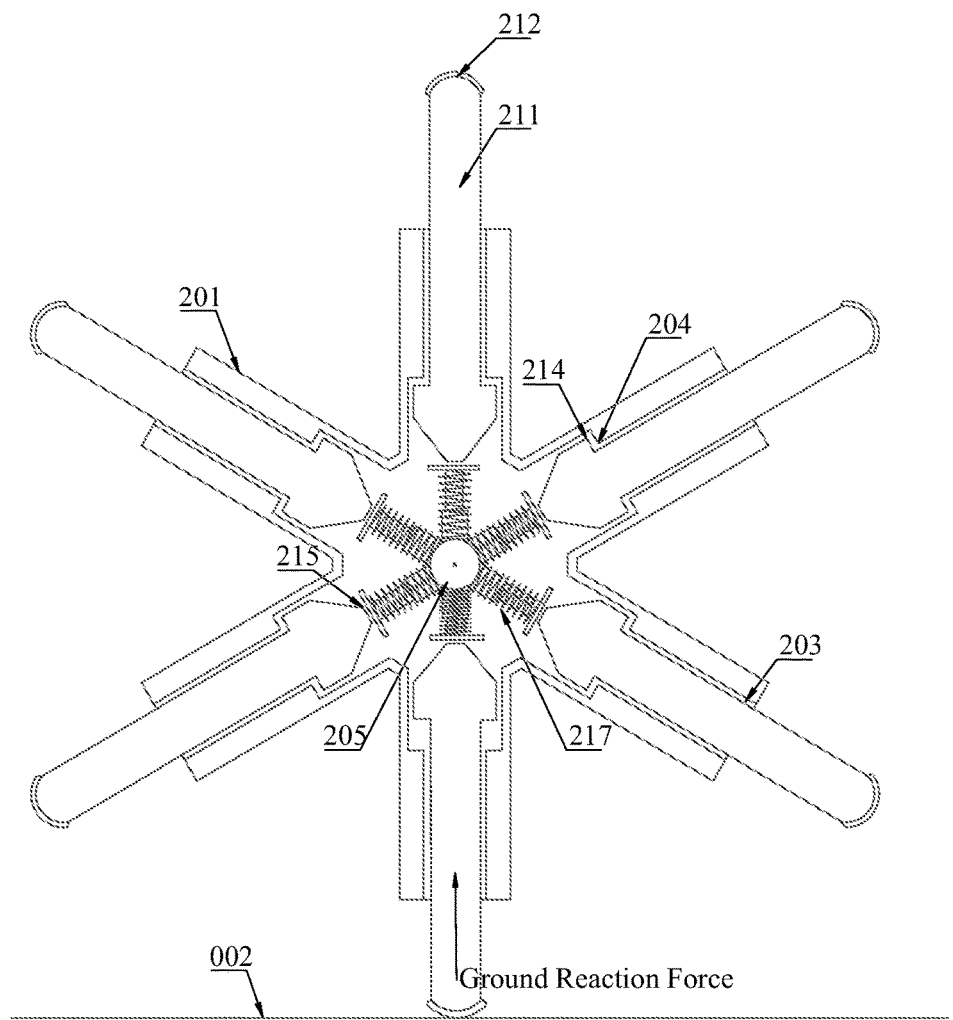
FIG. 4D shows a cross section view of the hub and legs with coil springs.

FIG. 4C shows a cross sectional view of the hub 201 and legs 211 with leg elastic 216. Several leg elastic holders 213 maintain one or more leg elastic 216 in place and are shaped to obtain a very specific tension in the leg elastic 216 in order to reach the necessary stiffness of the leg elastic 216. When leg 211 hits the ground through its foot 212, a ground reaction force is transmitted to the leg 211 causing it to translate through hubs sliding guide 203, which causes the leg inner mechanical stop 215 to contact and transmit force to leg elastic 216. Under the action of the force, leg elastic 216 will deform and will exert a push back force on leg 211. Stiffness and damping of leg elastic 216 are fundamental to the behavior, performance and capabilities of robotic system 001.

Note that other types of spring devices can be used instead of leg elastic 216 such as but not limited to coil spring, leaf spring, gas or hydraulic spring. An embodiment with a coil spring is shown in FIG. 4D FIGS. 5A through 5D show in detail the tail of the robot 001.

FIG. 5A shows a perspective view of the tail assembly 300 rigidly attached to the body assembly 100. In one embodiment, tail assembly 300 and body assembly 100 could be merged together to form a single assembly.

FIG. 5B shows a cross section of the inside of the tail assembly 300. The tail assembly 300 can be made out of one or more pieces and can hold any physical shape for aesthetic purposes. Electronics modules assembly 600 comprises a sensory unit 601, a battery 602, a control unit 603 and a communication unit 604. Note that the electronics module assembly 600 can be hosted within the body assembly 100 and/or at the tail assembly 300.

Figure 5C:
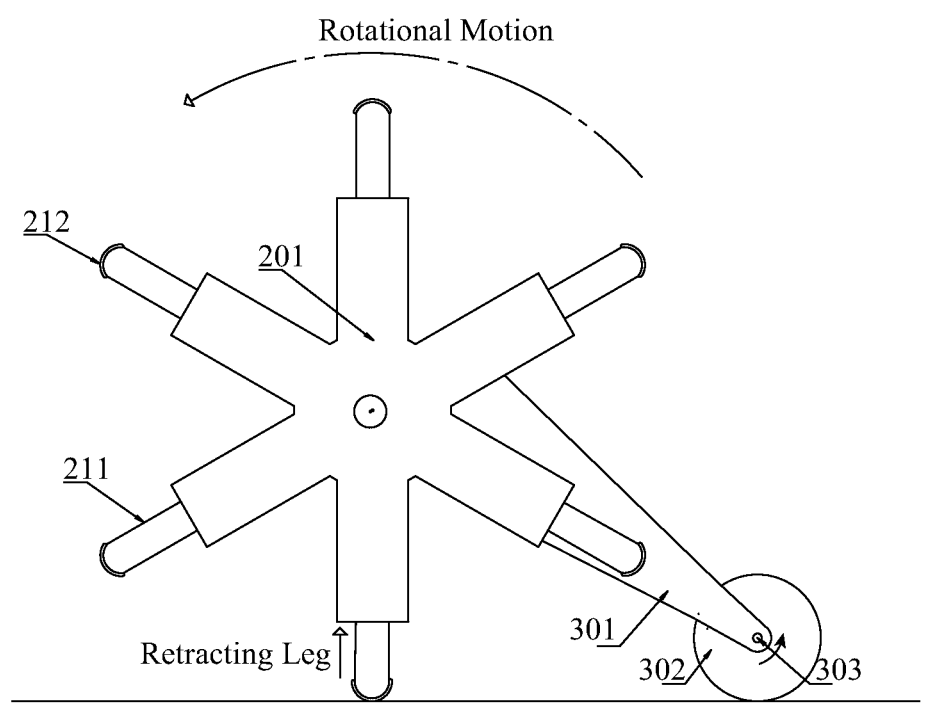
FIG. 5C shows a schematic of the tail with a wheels.

FIG. 5C shows a schematic of the tail assembly 300 with a tail wheel 302. The tail assembly 300 includes one or more tail wheels 302 at its end away from the body 101. The tail wheel 302 is attached to the tail 301 with a tail wheel shaft 303 that goes through it. When robotic system 001 moves forward or backward, the tail wheel 302 rolls on the ground 002. When robotic system 001 moves forward or backward, the tail wheel 302 is extremely effective at transmitting tail force (resulting from the action of motors 501) to the ground 002 without imposing a lot of friction to robotic system 001.

Figure 5D:
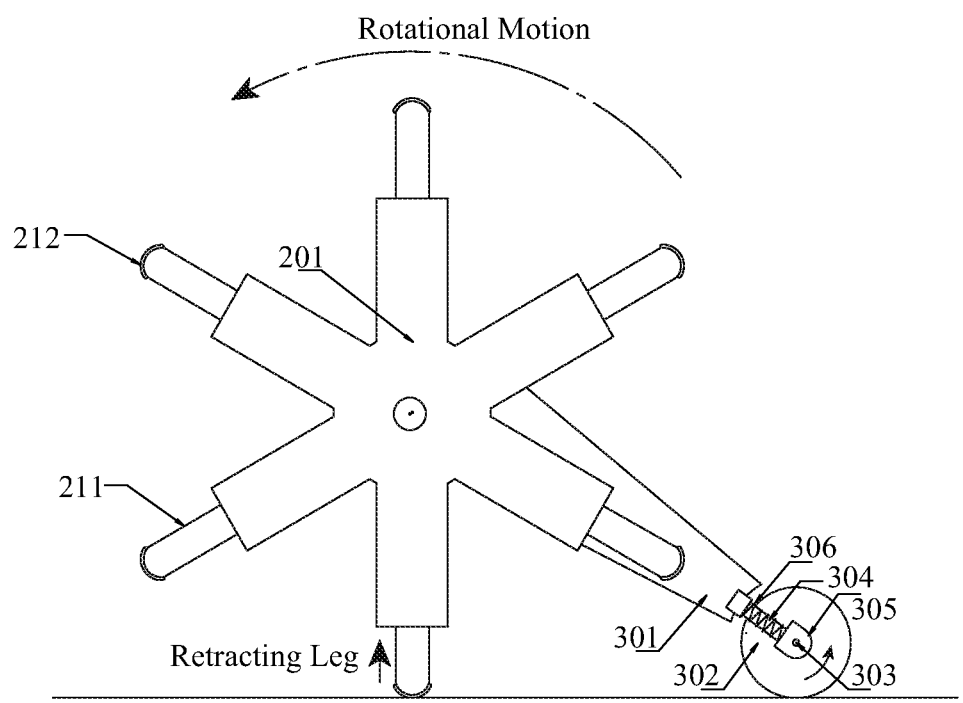
FIG. 5D shows a schematic of the tail with a spring loaded wheel.

FIG. 5D shows a schematic of the tail assembly 300 with a tail wheel 302 mounted on a suspension spring 306. The tail wheel 302 can be attached to the body with a suspension including a tail spring 306, a tail wheel shaft 303, and tail spring guide 304.

Figure 6A:
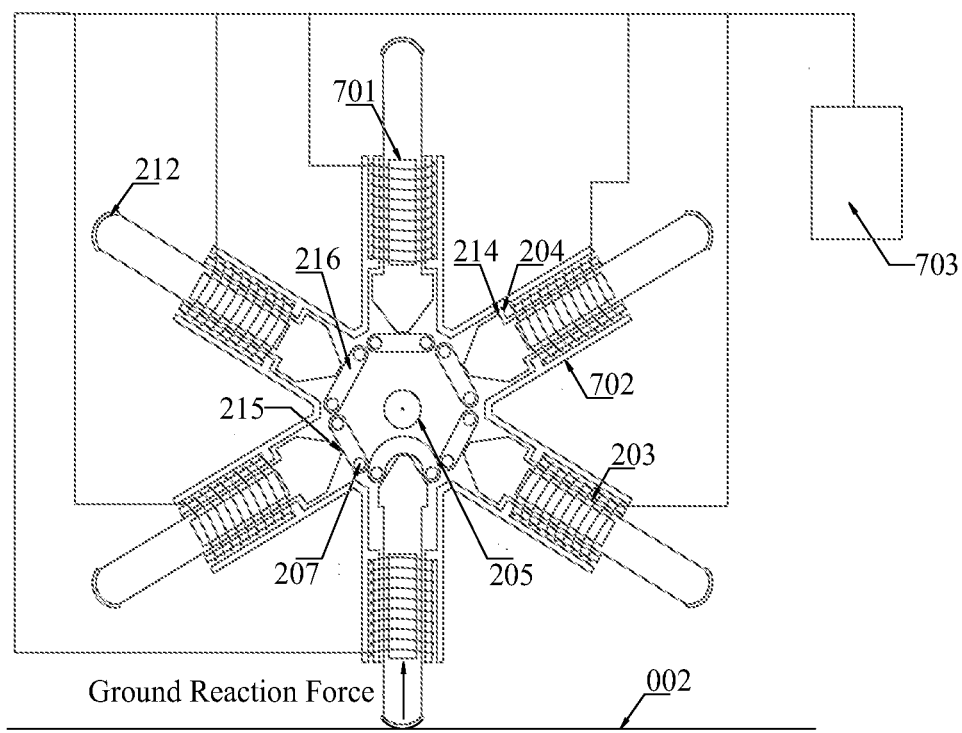
FIG. 6A is a perspective view showing the electric energy generating hub and legs system
Figure 6B:
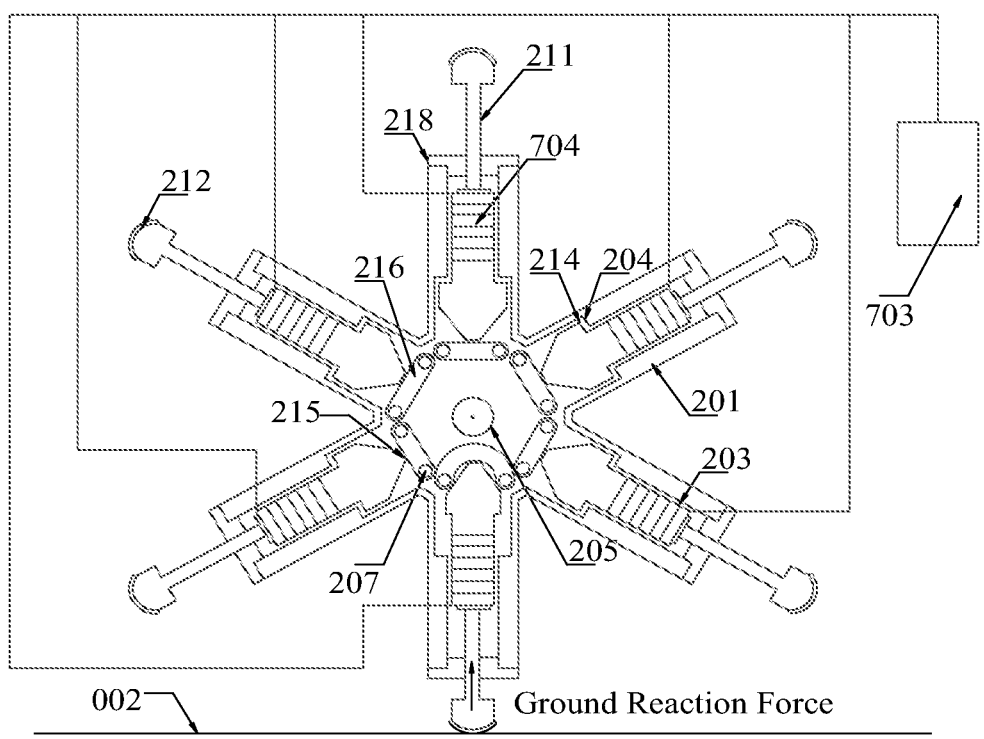
FIG. 6B is a perspective view showing the electric energy generating hub and legs system.

FIGS. 6A and 6B show two embodiments for an electrical energy generating hub and legs system. When in motion, the hub and legs assembly 200 rotates at very high speed (several hundred to thousands of rotations per minute). Each leg 211 slides linearly through the hub sliding guide 203 once per revolution meaning that overall all the legs 211 of the robotic system 001 slide through the hub sliding guide 203 several thousand times per minute. While some of the energy is mechanically recycled through the leg elastic 216, the hub and legs assembly 200 can also be fitted with an electric energy generating system to generate electrical energy each time one leg 211 is sliding through the hub sliding guide 203, or each time leg 211 is contacting the ground 002 through foot 212.

FIG. 6A shows an electrical energy generating hub and legs system based on a magnet and conductive coil. Leg 211 can be modified to add a magnet and obtain a leg with integrated magnet 701, and hub 201 can be modified to add a conductive coil around each hub sliding guide 203 and obtain a hub with integrated coils. In accordance with electromagnetic principles, when a magnet goes through a conductive coil, an electric current is generated in the coil. All the coils surrounding each hub recycling guide are connected to a circuitry 703 that harvests the generated energy.

FIG. 6B shows an electrical energy generating hub and legs system based on a piezoelectric system. The end effector of the piezo stack actuator 704 is mechanically fixed to foot 212. The casing of the piezo stack actuator 704 is mechanically fixed to leg 211. Robotic system 001, may have as many piezo stack actuators 704 as its number of legs 211. When foot 212 makes contact with ground 212, the compressive force on foot 212 is converted into electrical energy via piezo stack actuator 704. Each piezo stack actuator 704 is connected to a circuitry 703 that harvests the generated energy.

Having described the invention, we claim:

1. A self-propelled ground vehicle, comprising:
   a) a body, comprising:
      i) a drivetrain; and
      ii) a tail that constrains rotation of said body
   b) a plurality of hub and leg assemblies, each of said assemblies comprising:
      i) a hub rotatably connected to said drivetrain; and
      ii) at least one leg of said plurality of hub and leg assemblies radially connected to said hub
   c) a power source;
   d) wherein:
      i) legs of said plurality of hub and leg assemblies are radially and rigidly connected to said hubs;
      ii) legs of said plurality of hub and leg assemblies are equally angularly-spaced from other legs by an angle equal to 360 degrees divided by the number of legs in each of said plurality of hub and legs assemblies; and
      iii) legs of said plurality of hub and leg assemblies each have a foot or pad structure attached at the end configured to contact with said ground; and
   e) wherein said tail has at least one spring-loaded wheel at its end configured to contact the ground.

2. A self-propelled ground vehicle, comprising:
   a) a body, comprising:
      i) a drivetrain; and
      ii) a tail that constrains rotation of said body
   b) a plurality of hub and leg assemblies, each of said assemblies comprising:
      i) a hub rotatably connected to said drivetrain; and
      ii) at least one leg of said plurality of huh and leg assemblies radially connected to said hub
   c) a power source;
   d) wherein:
      i) legs of said plurality of hub and leg assemblies are radially and rigidly connected to said hubs;
      ii) legs of said plurality of hub and leg assemblies are equally angularly-spaced from other legs by an angle equal to 360 degrees divided by the number of legs in each of said plurality of hub and legs assemblies; and
      iii) legs of said plurality of hub and leg assemblies each have a foot or pad structure attached at the end configured to contact with said ground; and
   e) wherein said tail has at least one said hub and leg assembly at its end configured to contact the wound.

3. A self-propelled ground vehicle, comprising:
   a) a body, comprising:
      i) a drivetrain; and
      ii) a tail that constrains rotation of said body
   b) a plurality of hub and leg assemblies, each of said assemblies comprising:
      i) a hub rotatably connected to said drivetrain; and
      ii) at least one leg of said plurality of hub and leg assemblies radially connected to said hub
   c) a power source;
   d) wherein:
      i) legs of said plurality of hub and leg assemblies are radially and translationally connected to said hub;
      ii) legs of said plurality of huh and leg assemblies are equally angularly-spaced from an adjacent said leg by an angle equal to 360 degrees divided by the number of legs;

iii) legs of said plurality of hub and leg assemblies have a foot or pad structure at its end configured to contact with said ground;
iv) hubs of said plurality of hub and leg assemblies have a hub sliding guide to guide said leg translational motion along a radial axis of said hub;
v) legs and hubs of said plurality of hub and leg assemblies each have mechanical stops to constrain said legs to remain connected to said hubs;
vi) hubs of said plurality of hub and leg assemblies have a spring device configured to push said leg away from said hubs' axis of rotation; and
vii) legs of said plurality of hub and leg assemblies translate through said hub sliding guide toward said hub axis of rotation and deform said spring device under the action of a force applied to said, foot or pad-like structure e) wherein said tail has at least one spring-loaded wheel at its end configured to contact the ground.

4. A self-propelled ground vehicle, comprising:
a) a body, comprising:
  i) a drivetrain; and
  ii) a tail that constrains rotation of said body
b) a plurality of hub and leg assemblies, each of said assemblies comprising:
  i) a hub rotatably connected to said drivetrain; and
  ii) at least one leg of said plurality of hub and leg assemblies radially connected to said hub
c) a power source;
d) wherein:
  i) legs of said plurality of hub and leg assemblies are radially and translationally connected to said hub;
  ii) legs of said plurality of hub and leg assemblies are equally angularly-spaced from adjacent said leg by an angle equal to 360 degrees divided by the number of legs;
  iii) legs of said plurality of hub and leg assemblies have a foot or pad structure at its end configured to contact with said ground;
  iv) hubs of said plurality of hub and leg assemblies have a hub sliding guide to guide said leg translational motion along a radial axis of said hub;
  v) legs and hubs of said plurality of hub and leg assemblies each have mechanical stops to constrain said legs to remain connected to said hubs;
  vi) hubs of said plurality of hub and leg assemblies have a spring device configured to push said leg away from said hubs' axis of rotation; and
  vii) legs of said plurality of hub and leg assemblies translate through said hub sliding guide toward said hub axis of rotation and deform said spring device under the action of a force applied to said foot or pad structure; and
e) wherein said tail has at least one said hub and leg assembly at its end configured to contact the ground.

5. A self-propelled ground vehicle, comprising:
a) a body, comprising:
  i) a drivetrain; and
  ii) a tail that constrains rotation of said body
b) a plurality of hub and leg assemblies, each of said assemblies comprising:
  i) a hub rotatably connected to said drivetrain; and
  ii) at least one leg of said plurality of hub and leg assemblies radially connected to said hub
c) a power source;
d) wherein:
  i) legs of said plurality of hub and leg assemblies are radially and translationally connected to said hub;
  ii) legs of said plurality of hub and leg assemblies are equally angularly-spaced from adjacent said leg by an angle equal to 360 degrees divided by the number of legs;
  iii) legs of said plurality of hub and leg assemblies have a foot or pad structure at its end configured to contact with said ground;
  iv) hubs of said plurality of hub and leg assemblies have a hub sliding guide to guide said leg translational motion along a radial axis of said hub;
  v) legs and hubs of said plurality of huh and leg assemblies each have mechanical stops to constrain said legs to remain connected to said hubs;
  vi) hubs of said plurality of hub and leg assemblies have a spring device configured to push said leg away from said hubs' axis of rotation; and
  vii) legs of said plurality of hub and leg assemblies translate through said hub sliding guide toward said huh axis of rotation and deform said spring device under the action of a force applied to said foot or pad structure
e) wherein;
  i) a said hub has a conductive coil surrounding each of said sliding guides;
  ii) said leg has a magnet attached to it made of magnetic material;
  iii) said hub with conductive coil is generating electrical energy when said leg with a magnet attached to it or made of magnetic material is translating through said sliding guide; and
  iv) said conductive coil is connected to a circuitry to harvest generated energy.

6. A self-propelled ground vehicle, comprising:
a) a body, comprising:
  i) a drivetrain; and
  ii) a tail that constrains rotation of said body,
b) a plurality of hub and leg assemblies, each of said assemblies comprising:
  i) a hub rotatably connected to said drivetrain; and
  ii) at least one leg of said plurality of hub and leg assemblies radially connected to said hub;
c) a power source;
d) wherein:
  i) legs of said plurality of hub and leg assemblies are radially and translationally connected to said hub;
  ii) legs of said plurality of huh and leg assemblies are equally angularly-spaced from adjacent said leg by an angle equal to 360 degrees divided by the number of legs;
  iii) legs of said plurality of hub and leg assemblies have a foot or pad structure at its end configured to contact with said ground;
  iv) hubs of said plurality of hub and leg assemblies have a hub sliding guide to guide said leg translational motion along a radial axis of said hub;
  v) legs and hubs of said plurality of huh and leg assemblies each have mechanical stops to constrain said legs to remain connected to said hubs;
  vi) hubs of said plurality of hub and leg assemblies have a spring device configured to push said leg away from said hubs' axis of rotation; and
  vii) legs of said plurality of hub and leg assemblies translate through said hub sliding guide toward said hub axis of rotation and deform said spring device under the action of a force applied to said foot or pad structure;

e) wherein:
  i) said leg has a piezoelectric stack integrated between its two ends;
  ii) said piezoelectric stack generates electrical energy when a force is applied to one end of said leg; and
  iii) said piezoelectric stack is connected to a circuitry to harvest generated energy.

* * * * *